US009767170B2

(12) United States Patent
Osias

(10) Patent No.: US 9,767,170 B2
(45) Date of Patent: Sep. 19, 2017

(54) STORAGE AREA NETWORK ZONE OPTIMIZATION

(71) Applicant: INTERNATIONAL BUSINESS MACHINES CORPORATION, Armonk, NY (US)

(72) Inventor: Michael J. Osias, Westtown, NY (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 14/516,116

(22) Filed: Oct. 16, 2014

(65) Prior Publication Data

US 2016/0110431 A1 Apr. 21, 2016

(51) Int. Cl.
*G06F 17/30* (2006.01)
*H04L 29/08* (2006.01)
*G06F 17/27* (2006.01)

(52) U.S. Cl.
CPC .... *G06F 17/30554* (2013.01); *G06F 17/2705* (2013.01); *G06F 17/30595* (2013.01); *G06F 17/30876* (2013.01); *H04L 67/1097* (2013.01)

(58) Field of Classification Search
CPC ......... G06F 17/30864; G06F 17/30554; G06F 17/30595; G06F 11/3452
USPC ................. 707/755, 756, 716, 812, 999.105; 709/224; 370/389; 714/748
See application file for complete search history.

(56) References Cited

U.S. PATENT DOCUMENTS

| 7,489,639 | B2 * | 2/2009 | Breitgand ........... H04L 41/0631 370/241 |
| 8,019,840 | B2 | 9/2011 | McDougall et al. |
| 8,341,623 | B2 | 12/2012 | Korupolu et al. |
| 2003/0115306 | A1 | 6/2003 | Hagarty et al. |
| 2004/0054776 | A1 * | 3/2004 | Klotz ...................... H04L 41/06 709/224 |
| 2004/0085347 | A1 | 5/2004 | Hagarty, Jr. et al. |
| 2004/0153844 | A1 | 8/2004 | Ghose et al. |

(Continued)

OTHER PUBLICATIONS

Y. Hu, "Efficient and High Quality Force-Directed Graph Drawing", Wolfram Media, Inc., The Mathematica Journal, vol. 10, No. 1, 2006, pp. 37-71.

(Continued)

*Primary Examiner* — Dung K Chau
(74) *Attorney, Agent, or Firm* — John R. Pivnichny; Law Office of Jim Boice

(57) ABSTRACT

A storage area network (SAN) includes operational switches that contain zone databases of the SAN. A parsing logic parses the zone databases into a relational database that has descriptions of nodes and edges of the SAN. A graphic rendering engine operating on the relational database presents an undirected graph of the SAN. A structuring logic structures the undirected graph into a layout using one or more pre-defined algorithms, wherein the one or more pre-defined algorithms identify potentially problematic zones in the SAN. A metrics calculator calculates metrics of inbetweenness centrality, closeness centrality, and eccentricity of the SAN from the layout, wherein the metrics are applied as indicators to the layout to highlight problematic zones in the SAN. A display presents the layout with the indicators to enable optimization operations on the SAN.

20 Claims, 4 Drawing Sheets

(56) References Cited

U.S. PATENT DOCUMENTS

| | | | |
|---|---|---|---|
| 2006/0023708 A1* | 2/2006 | Snively | H04L 45/00 370/389 |
| 2009/0307346 A1* | 12/2009 | Patil | H04L 12/24 709/224 |
| 2011/0103258 A1* | 5/2011 | Chung | H04L 67/1097 370/254 |
| 2013/0117621 A1* | 5/2013 | Saraiya | H04L 49/356 714/748 |
| 2013/0343378 A1* | 12/2013 | Veteikis | H04L 49/555 370/389 |
| 2014/0156683 A1* | 6/2014 | de Castro Alves | G06F 17/30516 707/755 |

OTHER PUBLICATIONS

T. Fruchterman et al., "Graph Drawing by Force-Directed Placement", John Wiley & Sons, Ltd., Software—Practice and Experience, vol. 21, No. 1, Nov. 1991, pp. 1129-1164.

M. Jacomy et al., "ForceAtlas2, a Continuous Graph Layout Algorithm for Handy Network Visualization Designed for the Gephi Software", PLOS ONE, vol. 9, No. 6, Jun. 2014, pp. 1-12.

\* cited by examiner

STORAGE AREA NETWORK ZONE OPTIMIZATION

BACKGROUND

The present disclosure relates to the field of digital storage devices, and specifically to digital storage devices on a storage area network. Still more particularly, the present disclosure relates to optimizing zones in storage area networks.

A Storage Area Network (SAN) is a dedicated network of storage devices (e.g., disk arrays, tape drives, optical storage devices, etc.), computing devices, and switches that connect the storage/computing devices together. A SAN may be broken out into zones, which provide sub-units of the SAN through which data pathways traverse.

SUMMARY

In an embodiment of the present invention, a storage area network comprises: one or more operational switches, wherein said one or more operational switches contain zone databases of a storage area network; a parsing logic for parsing said zone databases into a relational database, wherein said relational database comprises descriptions of nodes and edges of said storage area network; a graphic rendering engine operating on said relational database to present an undirected graph of said storage area network; a structuring logic to structure said undirected graph into a layout using one or more pre-defined algorithms, wherein said one or more pre-defined algorithms identify potentially problematic zones in said storage area network; a metrics calculator to calculate metrics of inbetweenness centrality, closeness centrality, and eccentricity of said storage area network from said layout, wherein said metrics are applied as indicators to said layout to highlight problematic zones in said storage area network; and a display to display said layout with said indicators to perform optimization operations on said storage area network.

In an embodiment of the present invention, a method and/or computer program product optimizes a storage area network. One or more processors extract zone databases of a storage area network from one or more operational switches in the storage area network. The zone databases are parsed into a relational database, which includes descriptions of nodes and edges of the storage area network. An undirected graph of said storage area network is presented using a graphic rendering engine operating on the relational database. The undirected graph is structured into a layout using one or more pre-defined algorithms that identify potentially problematic zones in said storage area network. Metrics of inbetweenness centrality, closeness centrality, and eccentricity of the storage area network are calculated from the layout. These metrics are applied to the layout as indicators that highlight problematic zones in the storage area network. The layout with the indicators is used to perform optimization operations on the storage area network, thus modifying the problematic zones, based on the metrics, to reduce/remove problems in the problematic storage area network zone.

DETAILED DESCRIPTION

Figure 1:
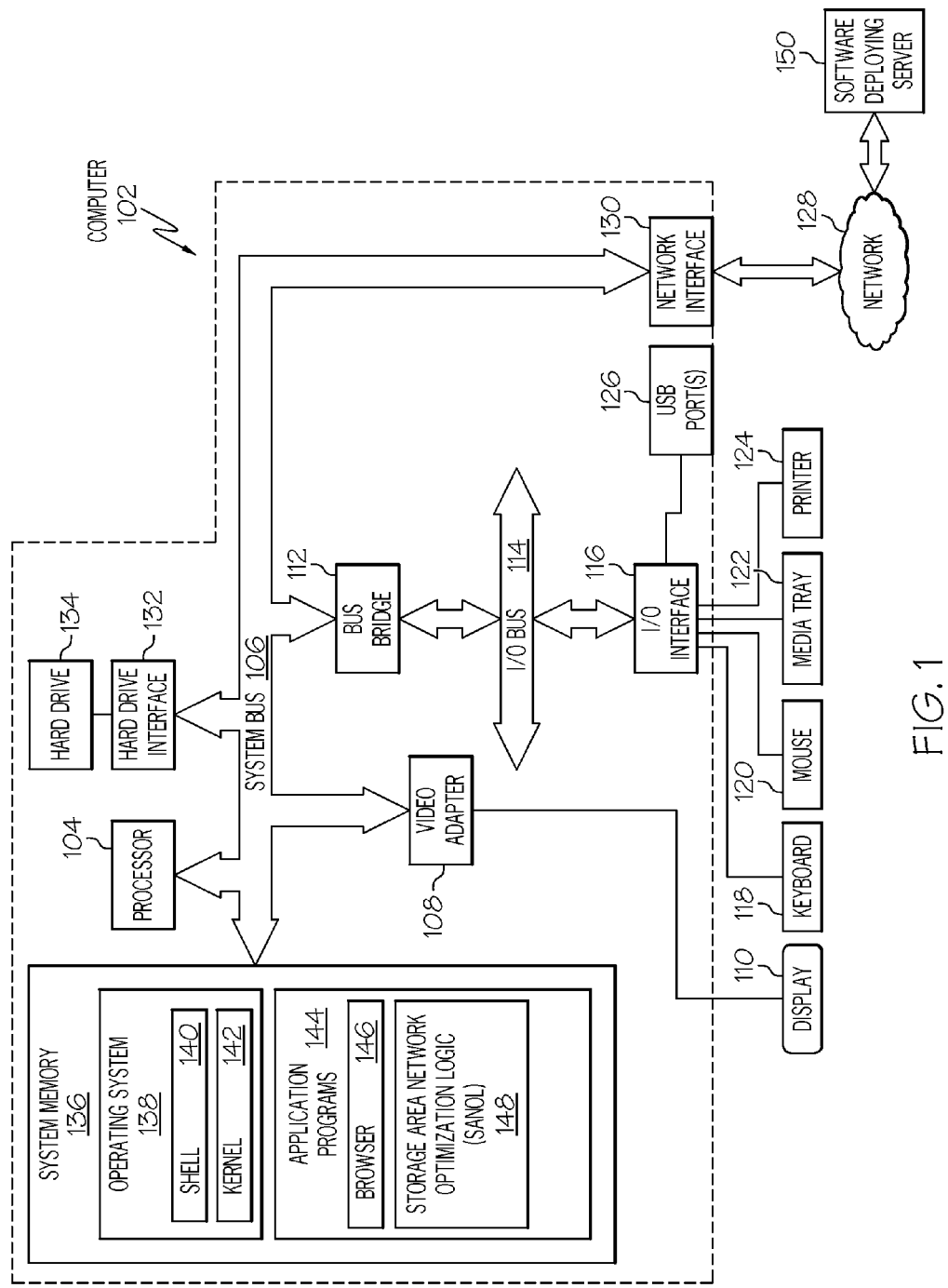
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150, as well as the storage area network (SAN) management computer 302, switches 306a-306n, storage devices 308a-308n, and/or computers 310a-310n shown in FIG. 3.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Storage Area Network Optimization Logic (SANOL) 148. SANOL 148 includes code for implementing the processes described below, including those described in FIGS. 2-4. In one embodiment, computer 102 is able to download SANOL 148 from software deploying server 150, including in an on-demand basis, wherein the code in SANOL 148 is not downloaded until needed for execution. Note further that, in one embodiment of the present invention, software deploying server 150 performs all of the functions associated with the present invention (including execution of SANOL 148), thus freeing computer 102 from having to use its own internal computing resources to execute SANOL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Large Storage Area Networks (SANs) are extremely complicated entities, especially related to their zoning, as well as to the data pathways that are used across a fabric (e.g., switches) to flow data to and from devices (including storage devices as well as computing devices on the SAN). Current known management tools are focused on deployment and operations with limited analytics capability beyond reporting metrics. The present invention, as described herein in one or more embodiments, enables pinpointing of highly connected nodes, loops, and other zoning anomalies through the use of computerized inspection.

In various embodiments of the present invention and in order to ensure an accurate representation of the SAN zones is available, zone databases are extracted from one or more operational switches. The zone database is then normalized into a relational schema using an automation process such as a Java program, which uses a relational schema consisting of nodes and edges of the SAN, to generate a SAN graph. Graph data derived from the relational schema is imported as an undirected graph into a graph manipulation tool. Further layout algorithms, such as the Yifan Hu, Fruchterman-Reingold, and Force Atlas algorithms, are applied to the graph to present the visual element. In an embodiment, further algorithms are run against the graph data to calculate Inbetweenness Centrality, Closeness Centrality, and Eccentricity. These metrics are used to color code and size nodes in the SAN graph according to a color scale (e.g., green/yellow/red) and/or a size scale (e.g., small, medium, and large).

Figure 2:
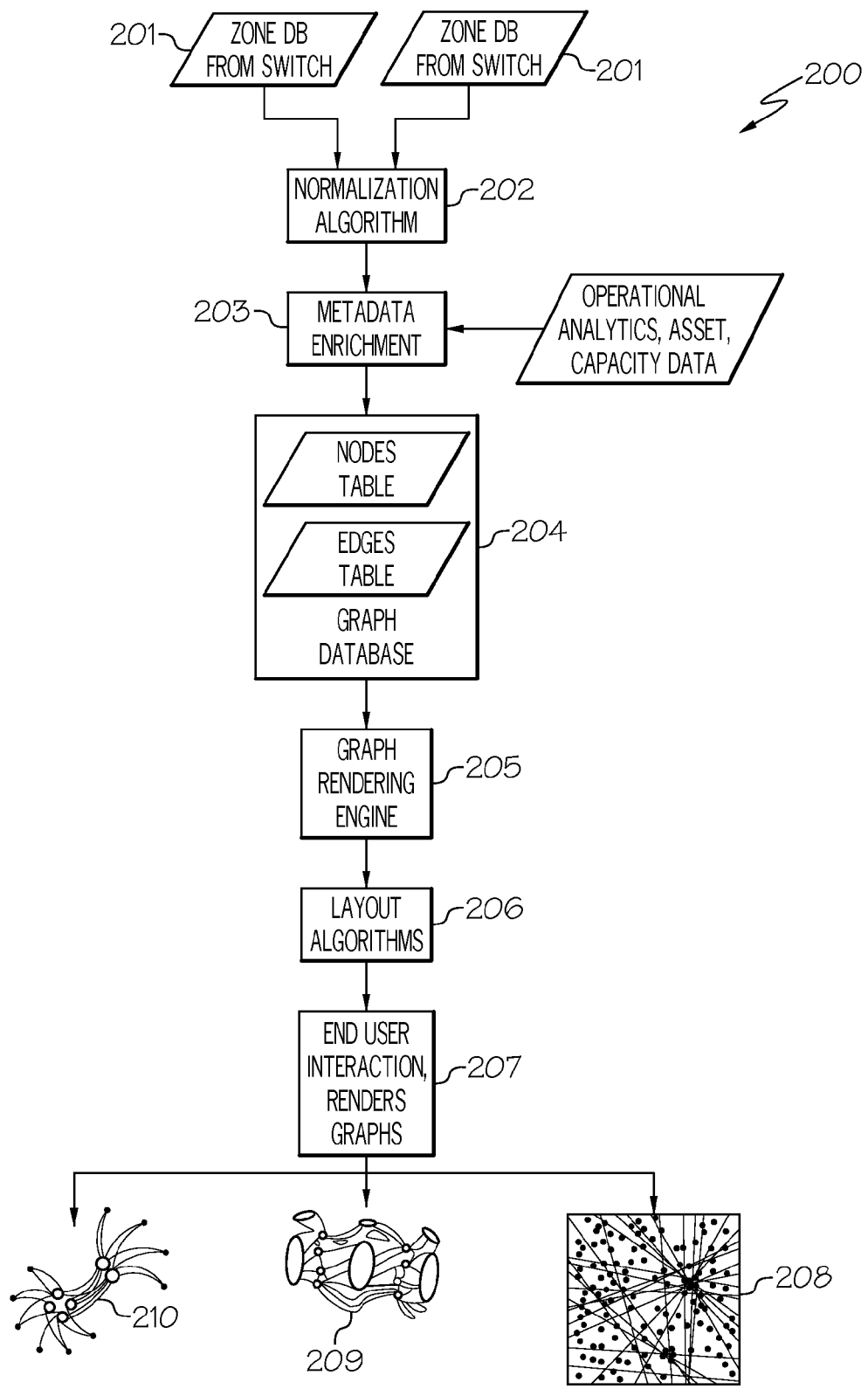
FIG. 2 illustrates a flow-chart of exemplary steps taken to graph a Storage Area Network (SAN) using information from switches in the SAN.

With reference now to FIG. 2, a flow-chart 200 of exemplary steps taken by one or more processors to graph a Storage Area Network (SAN) using information from switches in the SAN is presented.

As depicted in step 201, zone databases are retrieved from one or more core SAN switches. These zone databases may be an artifact, such as an extended markup language (XML) document, that has zoning information represented hierarchically. In an embodiment of the present invention, the SAN switches include identifiers for storage devices and/or computing devices that are coupled to each SAN switch. By consolidating these identifiers, a zone in the SAN is identified, thus leading to the zone database. A zone is defined in one embodiment of the present invention as a linkage of specific logic units in one or more storage devices to one or more other storage devices and/or computing devices. In another embodiment, a zone is defined as a geographic region of the SAN (i.e., where the storage/computing devices are physically located). In another embodiment, a zone is defined as a functional region of the SAN (i.e., an area of the SAN that is devoted to performing a particular task or type of task, such as bookkeeping, maintaining personnel records, ordering supplies, etc.).

As described in step 202, a normalization algorithm parses the source zone database into information that is later used to construct nodes and edges in a graph. This zone information is either taken directly from the SAN switches or after being derived from the identifiers of the storage/computing devices. That is, each SAN switch contains a database of resources (other switches, storage devices, computing devices) to which data is routed to and from (i.e., through) that SAN switch. The present invention uses this information to generate a graph of the SAN, which is then used to optimize the physical SAN.

As shown in step 203, optional additional metadata is added for metadata enrichment, which can be used to enrich the information content in step 207 below. Examples of such metadata include descriptions of the storage/computing devices and/or the SAN switches, including universal unique identifiers (UUIDs), make and model information, physical location, task assignment (i.e., which tasks or type of tasks is a particular switch/storage/computing device allocated), etc. of these resources (switches, storage devices, computing devices).

As shown in step 204, a graph database is then constructed from the zone database from the SAN switch and/or metadata derived in step 203. In an embodiment, the graph database is a relational database with tables containing information that describes nodes and edges of a SAN graph that depicts the SAN network.

As shown in step 205, a graph rendering engine ingests the nodes and edges (described in step 204) to import the database into its own internal data structures, thus leading to the creation and presentation of an undirected graph of the SAN network. The undirected graph shows connections between SAN switches and storage/computing devices, but does not show the direction of data flow between these resources (SAN switches and storage/computing devices in the SAN).

As shown in step 206, layout algorithms are applied to the SAN graph created in step 205. These algorithms structure the SAN graph into a layout which is most appropriate for the structure of the SAN. That is, the SAN graph includes metadata that describes the overall structure of the SAN, including the number of nodes (representing SAN switches and storage/computing devices in the SAN) in the SAN graph, the designed purpose of the SAN network, etc. Once the overall structure of the SAN graph and/or the SAN is identified by the system (e.g., SAN management computer 302 shown in FIG. 3), the system retrieves an algorithm that has been predetermined to be appropriate for the particular type of SAN.

In an embodiment, a Fruchterman-Reingold algorithm is used in response to the system determining that the SAN has certain zones that have more than a predetermined quantity of data traffic in the SAN (i.e., a certain zone is exchanging a high level of data between nodes as compared to other nodes in the SAN). The Fruchterman-Reingold algorithm is a force-directed layout algorithm, which utilizes interactive forces between nodes to minimize repulsive forces between the nodes. In an embodiment of the present invention, the Fruchterman-Reingold algorithm is used, not to minimize physical forces, but rather to minimize dataflow between nodes, such that nodes that have heavy data traffic therebetween are reconfigured to have a shorter route (e.g., by placing the resources represented by the nodes physically closer together and/or by removing intervening nodes between the two resources, thus shortening the route that data must take between the two resources).

In one embodiment, a Yifan Hu algorithm is used in response to the system determining that the SAN has more than a predefined quantity of nodes (e.g., more than 64,000) that describe resources (switches, storage devices, computing devices) in the SAN. The Yifan Hu algorithm uses an octree algorithm to approximate short and long range effects between nodes, plus an adaptive scheme for basic force-directed algorithms and a scheme for selecting the optimal depth of octree. An octree is a tree data structure in which each internal node has exactly eight children (nodes that depend on a parent node). This octree structure is then used to partition a three-dimensional space by recursively subdividing it into eight octants, thus leading to a three-dimensional (3-D) graph of the SAN.

In an embodiment of the present invention, a Force Atlas algorithm is used in response to the SAN having a uniformly distributed set of resources. The Force Atlas algorithm describes a SAN as if the resources (nodes depicting storage devices, computing devices, and/or switches that couple storage devices and computing devices to one another) were "charged" nodes that repel one another, while edges (connecting the nodes) act as springs that pull nodes towards one another, thus resulting in a balanced-state SAN. Of course, the resources and/or nodes are not actually "charged", but the math from the Force Atlas algorithm is used to balance the SAN/SAN graph such that nodes/resources are uniformly distributed (according to data pathways between the nodes/resources).

In an embodiment of the present invention, these and other algorithms are run against the graph data to calculate Inbetweenness Centrality, Closeness Centrality, and Eccentricity.

Inbetweenness Centrality describes whether or not particular nodes are between other nodes (as opposed to being a terminal leaf in the SAN graph), as well as how many nodes are connected to each particular node.

Closeness Centrality describes how far apart, route wise, two nodes are. That is, Closeness Centrality does not describe how close two nodes are physically, but rather how many nodes must be traversed to get from one node to another node.

Eccentricity describes a quantity of SAN switches in the SAN that are identified by the indicators as creating problematic zones due to being outside of the main portion of the SAN. That is, any SAN switch that is on the fringe (i.e., not in the center) of the SAN graph is defined as being "eccentric" (literally "away from the center"), which may result in problems, since the pathway to such an eccentric node is often longer than the pathway to nodes near the center of the SAN/SAN graph.

Once the SAN graph is created, color scales are configured by a graph engine (e.g., SAN management computer 302 shown in FIG. 3) by applying the metrics (e.g., problematic areas due to excessive inbetweenness, lack of centrality, and/or eccentricity of SAN nodes) described herein. These metrics thus detect anomalies in the SAN zones.

As described in step 207 in FIG. 2, an end user, in various embodiments a SAN management computer, interacts with the rendered graph (e.g., two-dimensional graph 208, color coded three-dimensional graph 209, and/or color coded two-dimensional graph 210) from steps 205/206. This interaction includes, but is not limited to the following activities.

In an embodiment of the present invention, subgraphs are extracted for a focused analysis. For example, consider the SAN graph 300 depicted in FIG. 3. SAN graph 300 depicts a SAN 304 that is managed by a SAN management computer 302 (e.g., computer 102 shown in FIG. 1). Within the SAN 304 are multiple SAN switches, one or more storage devices, and/or one or more computing devices. These resources are depicted in SAN graph 300 as nodes, which are depicted as SAN switches 306a-306n (where "n" is an integer), storage devices 308a-308n (where "n" is an integer), and computers 310a-310n (where "n" is an integer). SAN graph 300 is an undirected graph that includes visual indicators of an exemplary problematic zone.

For example, consider SAN zone 312. As depicted, SAN zone 312 has four nodes (for storage devices 308a-308c and computer 310a) coupled to a single switch 306a. SAN zone 314 has only two nodes (computer 310b and computer 310c) coupled to a single switch 306b. Thus, SAN zone 312 initially would appear to be more complex (having more nodes controlled by switch 306a) that SAN zone 314. However, a further examination of the SAN zone database (not depicted) within switch 306b reveals that devices within SAN zone 316 are coupled, either directly or indirectly, to switch 306c, thus increasing the number of nodes that ultimately use switch 306b to eight (SAN switches 306c, 306d, 306n; storage devices 308d, 308n; and computers 310b, 310c, 310n). Thus, SAN zone 314 ultimately has more devices and/or more paths than SAN zone 312.

In an embodiment of the present invention, a global analysis of the SAN graph 300 identifies connected nodes. These connections may be direct or indirect. For example, switch 306a is directly connected to four nodes (storage devices 308a, 308b, 308c and computer 310a), which is greater than the two nodes (computer 310b, 310c) that are directly connected to switch 306b. However, as described above, switch 306b indirectly has routes/pathways to eight nodes (SAN switches 306c, 306d, 306n; storage devices 308d, 308n; and computers 310b, 310c, 310n).

In an embodiment of the present invention, paths through nodes in the network are traced with "path-tracing shortest path" algorithms. For example, consider pathway 318 in FIG. 3. Pathway 318 leads directly from switch 306b to storage device 308n, rather than having to traverse through computer 310b, switch 306c, storage device 308d, and switch 306d. These two pathways are both described in the zone database (not shown) in switch 306b. Thus, the SAN management computer 302 is able to determine that the shortest path from switch 306b to storage device 308n is via pathway 318.

In an embodiment of the present invention, the system repeats step 206 and applies layout and metrics algorithms of different types and parameters for new views of the network. That is, assume that the initial view of the SAN was the two-dimensional graph 208 shown in FIG. 2. By applying new parameters and graphing algorithms to the zone data from the SAN switches, a different color coded three-dimensional graph 209 can be generated.

Figure 3:
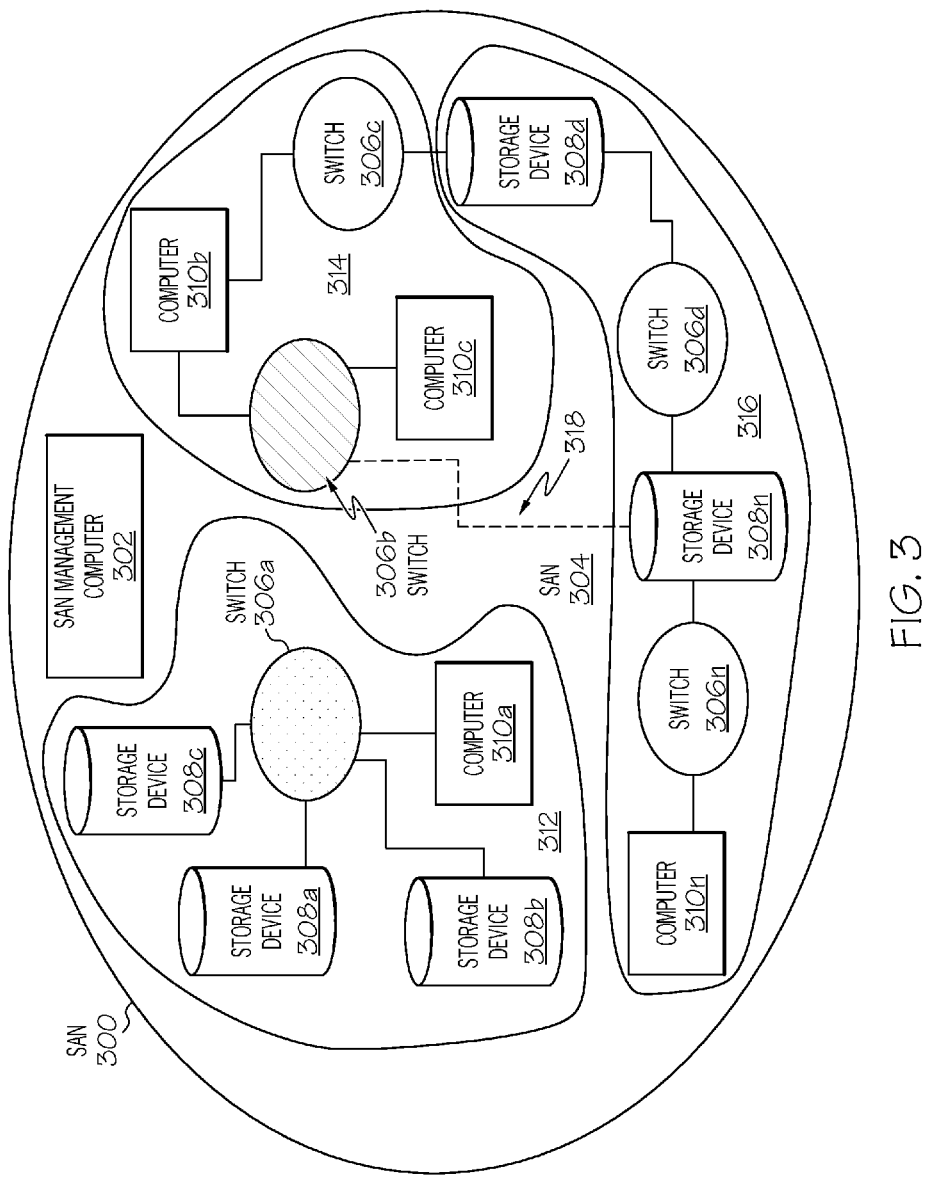
FIG. 3 depicts an undirected graph of an exemplary SAN.

Thus, as depicted in FIG. 3 and described in FIG. 2, an embodiment of the present invention is a storage area network (e.g., SAN 304 in FIG. 3) that includes one or more operational switches (e.g., switches 306a-306n shown in FIG. 3). These operational switches contain zone databases of the storage area network. A parsing logic (e.g., part of SAN management computer 302) parses the zone databases from the operational switches into a relational database, which includes descriptions of nodes and edges of the SAN.

A graphic rendering engine (e.g., SAN management computer 302 in FIG. 3) operates on the relational database to create/present an undirected graph (e.g., SAN graph 300 in FIG. 3) of the SAN. A structuring logic (e.g., also part of the SAN management computer 302 in FIG. 3) structures the undirected graph into a layout using one or more pre-defined algorithms, which identify potentially problematic zones in the SAN. A metrics calculator (e.g., also part of the SAN management computer 302 in FIG. 3) calculates metrics of inbetweenness centrality, closeness centrality, and eccentricity of the SAN from the layout. These metrics are applied as indicators to the layout, thereby highlighting problematic zones in the SAN. A display (e.g., display 110 in FIG. 1) displays the layout with the indicators to enable optimization operations on the SAN.

In an embodiment of the present invention, the zone databases from the operational switches include identifications of computers and storage devices that are coupled to each of the operational switches. The graph layout is thus constructed/derived from the identifications of computers and storage devices that are coupled to each of the operational switches.

In an embodiment of the present invention, the problematic zones in the SAN are zones of storage devices that are routed to more than a predetermined quantity of other devices in the SAN.

In an embodiment of the present invention, the eccentricity is calculated based on how many switches in the SAN are identified by the indicators as creating problematic zones due to being outside of a predefined central region of the SAN.

In an embodiment of the present invention, the SAN further includes a three-dimensional graph generator (e.g., part of the SAN management computer 302 shown in FIG. 3) for displaying the layout of the SAN as a three-dimensional graph (e.g., the color coded three-dimensional graph 209 shown in FIG. 2). This three-dimensional graph depicts potentially problematic zones on different strata of the three-dimensional graph. For example, in the color coded three-dimensional graph 209 in FIG. 2, zones in the upper region are color coded as being problematic and in need of immediate reconfiguration, while zones in the lower region are color coded as potentially being problematic if not reconfigured, although they are not currently problematic. That is, the lower zones are still within nominal ranges of operation, but may become problematic (outside the nominal operation ranges) if workloads increase, etc.

Once the problematic zones of the SAN (as depicted in the SAN graph) are identified, the SAN itself may be reconfigured to remove any problematic zones. For example, if the SAN graph depicts a particular switch as having more than a predetermined number of routes leading into and/or away from that particular switch, additional switches may be added in parallel with that particular switch, thus reducing its workload. Similarly, if the SAN graph depicts a storage device as being eccentric (i.e., such that data to/from that storage device must traverse through several resources in the SAN, resulting in a long route/pathway to that storage device), then that storage device may be replaced with another storage device that is closer (i.e., the route to the other storage device is shorter) than the eccentric storage device. Similarly, if the SAN graph depicts a SAN switch as being underutilized (e.g., only a couple of resources route data through that SAN switch while other SAN switches in the SAN route data for hundreds of resources in the SAN), then that SAN switch may be reconfigured to take on more routes from the resources in the SAN.

Figure 4:
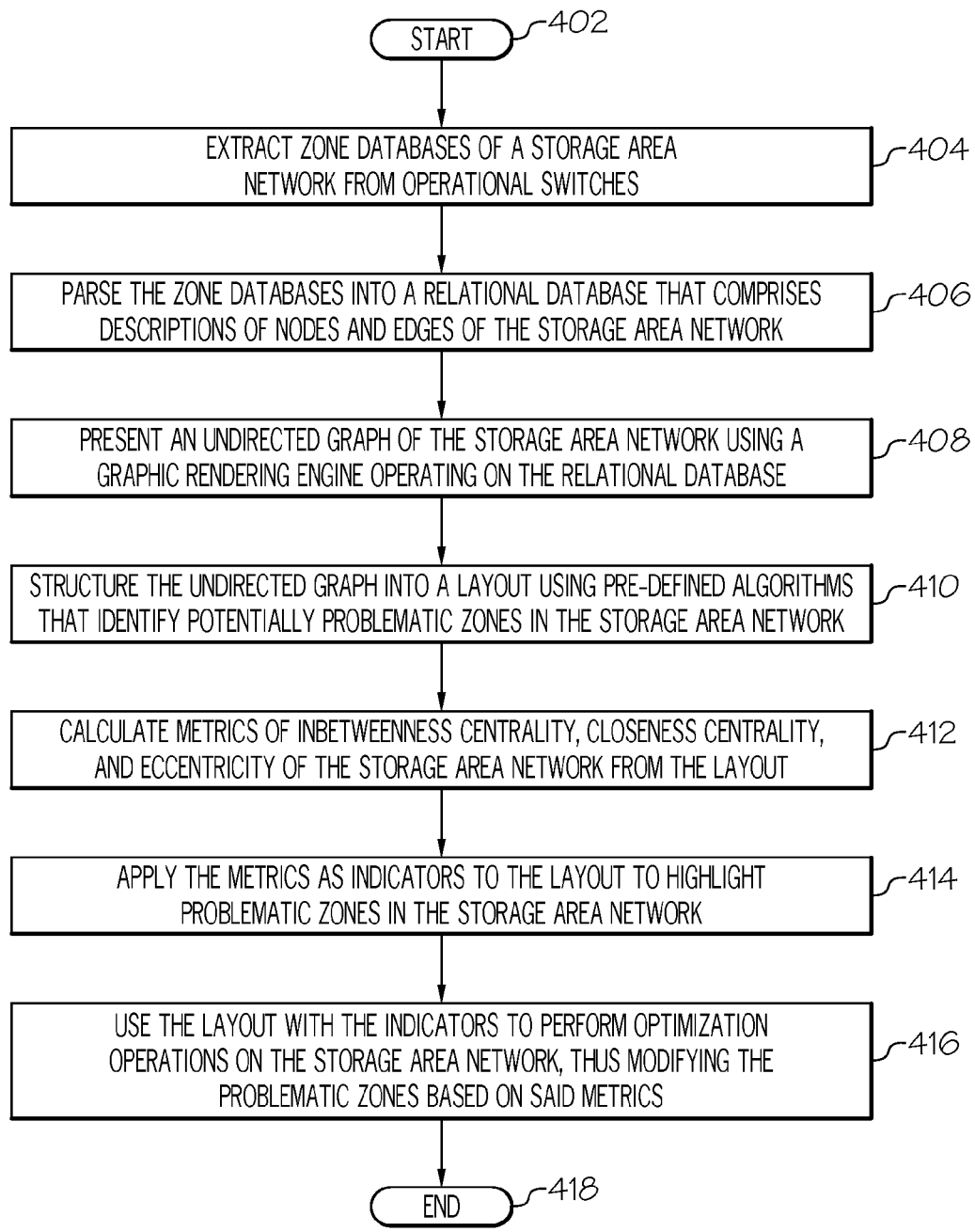
FIG. 4 is a high level flow chart of one or more steps performed by one or more hardware devices and/or processors to optimize a SAN using information from an enhanced rendered graph of the SAN.

With reference now to FIG. 4, a high level flow chart of one or more steps performed by one or more hardware devices and/or processors to optimize a SAN using information from an enhanced rendered graph of the SAN is presented.

After initiator block 402, one or more processors extract zone databases of a storage area network from one or more operational switches in the storage area network (block 404). As described in block 406, processors then parse the zone databases into a relational database. Each relational database contains descriptions of nodes and edges of the SAN, including the identifications of resources (other switches, storage devices, computers) that are routed to and from a particular switch.

As described in block 408, the processors present an undirected graph of the SAN using a graphic rendering engine (e.g., part of SAN management computer 302 in FIG. 3), which operates on the relational database. Processors then structure the undirected graph into a layout using one or more pre-defined algorithms, as described in block 410. These pre-defined algorithms identify potentially problematic zones in the SAN. In an embodiment of the present invention, the pre-defined algorithms comprise a Yifan Hu algorithm, a Fruchterman Reingold algorithm, and a Force Atlas algorithm.

As described in block 412, processors calculate metrics of inbetweenness centrality, closeness centrality, and eccentricity of the SAN from the layout. In an embodiment of the present invention, processors calculate the inbetweenness centrality of the SAN based on how many nodes in the SAN route messages between two or more other nodes of the SAN. In an embodiment of the present invention, processors calculate the closeness centrality of the SAN based on physical proximities of nodes of the SAN between one another. In an embodiment of the present invention, processors calculate the eccentricity based on how many switches in the SAN are identified by said indicators as creating problematic zones due to being outside of a predefined central region of the SAN.

The processors then apply the calculated metrics as indicators to said layout, in order to highlight problematic zones in the SAN (block 414). As described in block 416, the processors then use the layout, with the indicators, to perform optimization operations on the storage area network. These optimization operations modify the problematic zones based on the metrics. The flow-chart ends at terminator block 418.

In various scenarios of the present invention, the zone databases from the operational switches include identifications of computers and storage devices that are coupled to each of the operational switches. In an embodiment of the present invention in which this scenario applies, the method further comprises constructing the layout from the identifications of computers and storage devices that are coupled to each of the operational switches.

In an embodiment of the present invention, the problematic zones in the SAN are zones of storage devices that are routed to more than a predetermined quantity of other devices in the SAN. That is, if a particular zone has devices to which more routes flow to other devices than nodes in other zones, then that particular zone is deemed to be problematic. In an embodiment of the present invention, the other devices are other storage devices. In an embodiment, the other devices are computers.

In an embodiment of the present invention, processors structure the layout of the SAN as a three-dimensional graph, which depicts the potentially problematic zones on different strata of the three-dimensional graph.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A storage area network comprising:
   one or more operational switches, wherein said one or more operational switches contain zone databases of said storage area network;
   a parsing logic for parsing said zone databases into a relational database, wherein said relational database comprises descriptions of nodes and edges of said storage area network;
   a graphic rendering engine operating on said relational database to present an undirected graph of said storage area network;
   a structuring logic to structure said undirected graph into a layout using one or more pre-defined algorithms, wherein said one or more pre-defined algorithms identify potentially problematic zones in said storage area network;
   a metrics calculator to calculate metrics of inbetweenness centrality, closeness centrality, and eccentricity of said storage area network from said layout, wherein said metrics are applied as indicators to said layout to highlight problematic zones in said storage area network; and
   a display to display said layout with said indicators to enable optimization operations on said storage area network.

2. The storage area network of claim 1, wherein said zone databases from said one or more operational switches include identifications of computers and storage devices that are coupled to each of said one or more operational switches, and wherein said layout is constructed from said identifications of computers and storage devices that are coupled to each of said one or more operational switches.

3. The storage area network of claim 1, wherein said problematic zones in said storage area network are zones of storage devices that are routed to more than a predetermined quantity of other devices in said storage area network.

4. The storage area network of claim 1, wherein said eccentricity is calculated based on a quantity of switches in said storage area network that are identified by said indicators as creating problematic zones due to being outside of a predefined central region of the storage area network.

5. The storage area network of claim 1, further comprising:
   a three-dimensional graph generator for displaying said layout of said storage area network as a three-dimensional graph, wherein said three-dimensional graph depicts said potentially problematic zones on different strata of said three-dimensional graph.

6. A method of optimizing a storage area network, said method comprising:
   extracting, by one or more processors, zone databases of a storage area network from one or more operational switches in the storage area network;
   parsing, by one or more processors, said zone databases into a relational database, wherein said relational database comprises descriptions of nodes and edges of said storage area network;
   presenting, by one or more processors, an undirected graph of said storage area network using a graphic rendering engine operating on said relational database;
   structuring, by one or more processors, said undirected graph into a layout using one or more pre-defined algorithms, wherein said one or more pre-defined algorithms identify potentially problematic zones in said storage area network;
   calculating, by one or more processors, metrics of inbetweenness centrality, closeness centrality, and eccentricity of said storage area network from said layout;
   applying, by one or more processors, said metrics as indicators to said layout to highlight problematic zones in said storage area network; and
   using, by one or more processors, said layout with said indicators to perform optimization operations on said storage area network, wherein said optimization operations modify said problematic zones based on said metrics.

7. The method of claim 6, wherein said zone databases from said one or more operational switches include identifications of computers and storage devices that are coupled to each of said one or more operational switches, and wherein said method further comprises:
   constructing, by one or more processors, said layout from said identifications of computers and storage devices that are coupled to each of said one or more operational switches.

8. The method of claim 6, wherein said problematic zones in said storage area network are zones of storage devices that are routed to more than a predetermined quantity of other devices in said storage area network.

9. The method of claim 8, wherein said other devices are other storage devices.

10. The method of claim 8, wherein said other devices are computers.

11. The method of claim 6, further comprising:
    calculating, by one or more processors, said inbetweenness centrality of said storage area network based on a quantity of nodes in said storage area network that route messages between two or more other nodes of said storage area network.

12. The method of claim 6, further comprising:
calculating, by one or more processors, said closeness centrality of said storage area network based on physical proximities of nodes of said storage area network between one another.

13. The method of claim 6, further comprising:
calculating, by one or more processors, said eccentricity based on a quantity of switches in said storage area network that are identified by said indicators as creating problematic zones due to being outside of a predefined central region of the storage area network.

14. The method of claim 6, further comprising:
structuring, by one or more processors, said layout of said storage area network as a three-dimensional graph, wherein said three-dimensional graph depicts said potentially problematic zones on different strata of said three-dimensional graph.

15. The method of claim 6, wherein said one or more pre-defined algorithms comprise a Yifan Hu algorithm, a Fruchterman Reingold algorithm, and a Force Atlas algorithm.

16. A computer program product for optimizing a storage area network, wherein said computer program product comprises a computer readable storage medium having program code embodied therewith, wherein said computer readable storage medium is not a transitory signal per se, and wherein said program code is readable and executable by a processor to perform a method comprising:
extracting zone databases of a storage area network from one or more operational switches in the storage area network;
parsing said zone databases into a relational database, wherein said relational database comprises descriptions of nodes and edges of said storage area network;
presenting an undirected graph of said storage area network using a graphic rendering engine operating on said relational database;
structuring said undirected graph into a layout using one or more pre-defined algorithms, wherein said one or more pre-defined algorithms identify potentially problematic zones in said storage area network;
calculating metrics of inbetweenness centrality, closeness centrality, and eccentricity of said storage area network from said layout;
applying said metrics as indicators to said layout to highlight problematic zones in said storage area network; and
using said layout with said indicators to perform optimization operations on said storage area network.

17. The computer program product of claim 16, wherein said zone databases from said one or more operational switches include identifications of computers and storage devices that are coupled to each of said one or more operational switches, and wherein said method further comprises:
constructing said layout from said identifications of computers and storage devices that are coupled to each of said one or more operational switches.

18. The computer program product of claim 16, wherein said method further comprises:
calculating said eccentricity based on a quantity of switches in said storage area network that are identified by said indicators as creating problematic zones due to being outside of a predefined central region of the storage area network.

19. The computer program product of claim 16, wherein said method further comprises:
structuring said layout of said storage area network as a three-dimensional graph, wherein said three-dimensional graph depicts said potentially problematic zones on different strata of said three-dimensional graph.

20. The computer program product of claim 16, wherein said one or more pre-defined algorithms comprise a Yifan Hu algorithm, a Fruchterman Reingold algorithm, and a Force Atlas algorithm.

* * * * *